Figure 1:
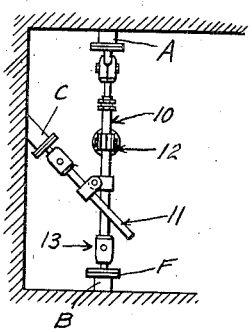

Nov. 18, 1947.　　　J. A. WOODS　　　2,431,100
TEMPLET FOR PIPE SYSTEMS
Filed Sept. 29, 1942　　　2 Sheets-Sheet 1

Inventor
JOHN A. WOODS
Attorney

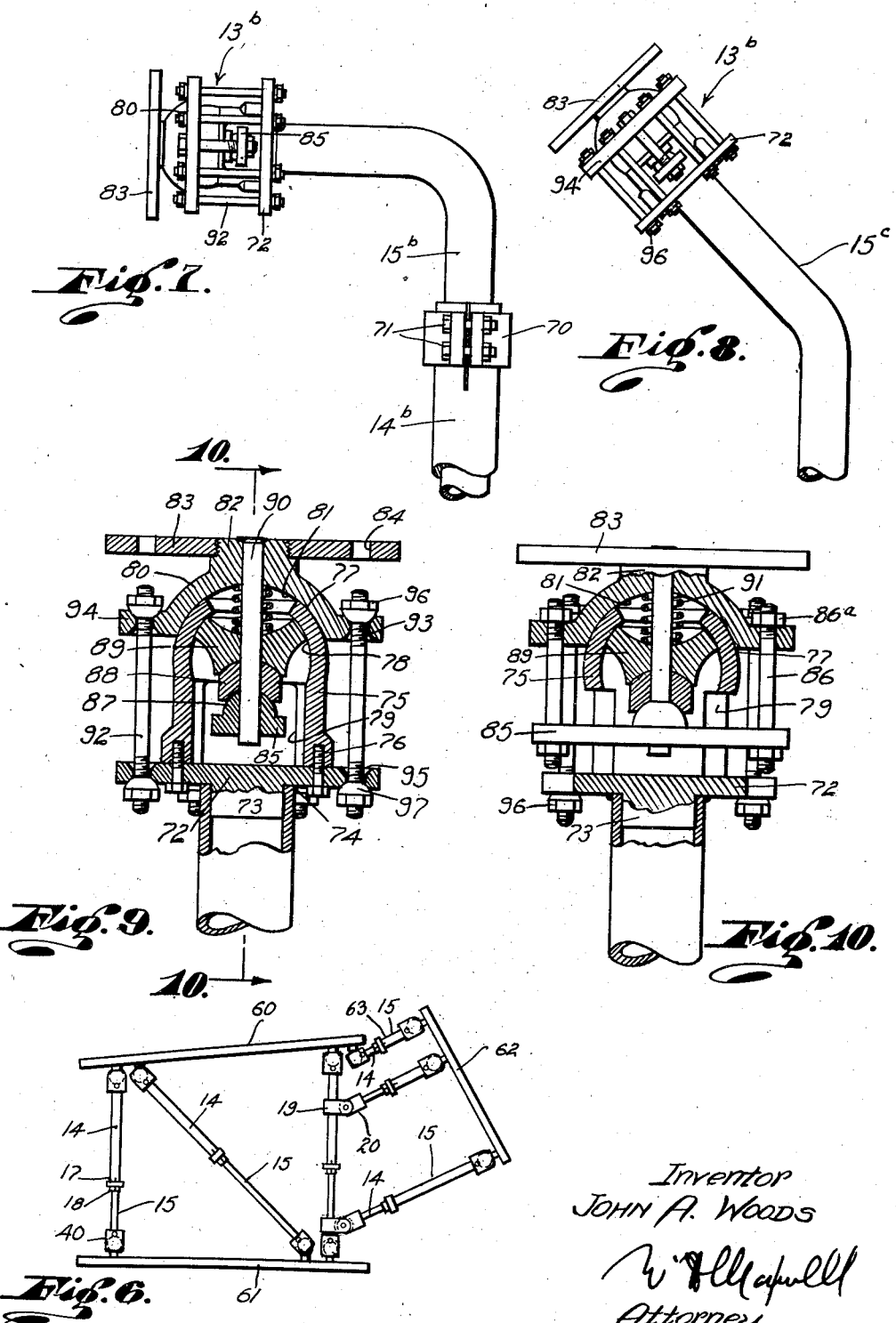

Patented Nov. 18, 1947

2,431,100

UNITED STATES PATENT OFFICE 2,431,100

TEMPLET FOR PIPE SYSTEMS

John A. Woods, Wilmington, Calif.

Application September 29, 1942, Serial No. 460,115

5 Claims. (Cl. 33—174)

This invention relates to templets and relates more particularly to articulated or adjustable templets. A general object of this invention is to provide an adjustable templet useful in fabricating pipe, etc. to fit given installations.

In many situations it is desirable and, in some cases, necessary to assemble, shape or fabricate an object or assembly to occupy a given position and to connect it with given objects of a previously constructed structure or apparatus. For example, in the building of ships there are places where pipe units or assemblies must be fabricated to connect with flanges or pipe parts installed on or built into bulk heads, etc. In such cases it is a difficult and time consuming operation to measure the distances and angles between the previously installed fittings in order to construct a fabricated assembly or unit that will correctly engage or fit between them. Furthermore, after such measurements have been made it is extremely difficult to fabricate the pipe unit to correctly mate with the previously installed flanges or pipe parts. This is particularly true when the pipe parts or assemblies are to be welded together as in modern ship building practice. In my co-pending application Serial No. 460,116, filed September 29, 1942, I have described and claimed a fabricating device to facilitate the fabrication of the pipe units and assemblies and, while the present invention is not limited to any given use or application, it is particularly adapted for use with the fabricator of my co-pending application.

Another object of this invention is to provide a templet that may be easily and quickly adjusted or set to correctly engage between spaced pipe parts, such as spaced angularly related pipe flanges, and then taken to the fabricator of my co-pending application, above referred to, and utilized in adjusting or setting the flange or pipe supporting elements of the same in exactly the same relationship as the flanges or pipe parts at the job or installation so that the pipe assemly may be fabricated to correctly fit the already installed piping elements. In mass production work the templet of the invention may be employed to facilitate the setting of a plurality of the fabricators so that several workmen or groups of workmen may be simultaneously engaged in the welding together or fabrication of the pipe assemblies or units.

Another object of this invention is to provide a templet of the character mentioned that may embody two, three or more work-engaging parts, such as flanges for mating with corresponding or complementary parts of the already installed apparatus or piping to constitute a complete templet for an entire piping assembly or unit which may embody Y's, elbows, T's, cross fittings, etc. with their flanged pipes, fittings or sections, etc.

Another object of this invention is to provide a templet of the character referred to that is simple and easy to set or condition and which remains in the adjusted or set state until deliberately altered or readjusted.

Another object of this invention is to provide a templet of the character referred to that has a wide range of adjustability, being capable of extensive elongation and contraction and having parts capable of movement or adjustment in practically any direction and to practically any position.

Another object of this invention is to provide a templet of the character referred to embodying novel clamp means for releasably clamping or securing its sections or parts in the required relations.

A further object of this invention is to provide a templet of the character referred to embodying novel and particularly effective universally adjustable pipe engaging parts, such as flanges, for mating with complementary elements of the previously installed piping at the job or point of installation.

Figure 5:
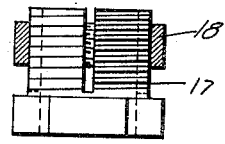
Figure 3:
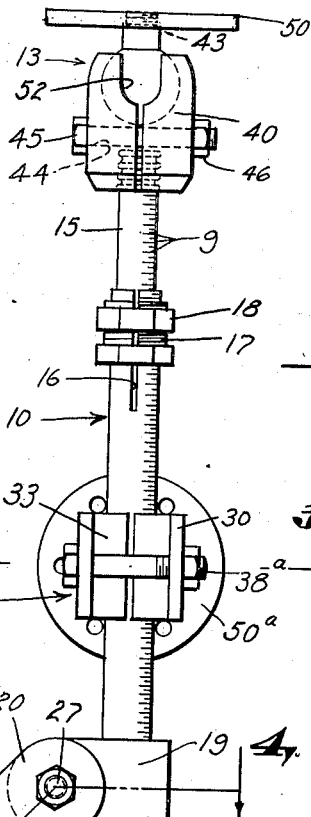
Figure 3:
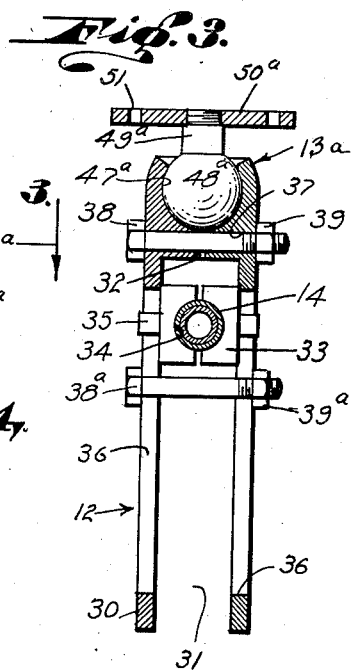
Figure 2:
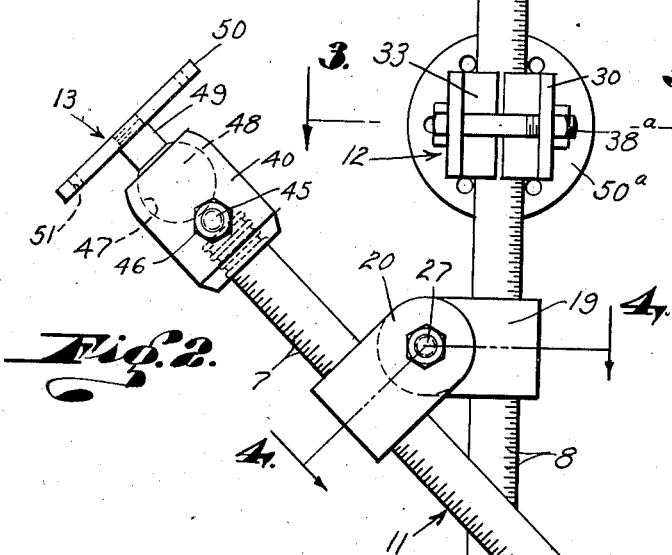
Figure 4:
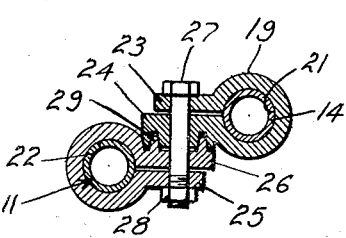

The various objects and features of my invention will be fully understood from the following detailed description of typical preferred forms and applications of my invention, throughout which description reference is made to the accompanying drawings, in which:

Fig. 1 is a more or less diagrammatic view illustrating one manner in which the templet of the invention may be employed in connection with pipe ports, or the like, previously installed or fixed in a structure. Fig. 2 is an enlarged elevation view of the templet set or adjusted in accordance with the relationship of pipe parts shown in Fig. 1. Figs. 3 and 4 are transverse detailed sectional views taken as indicated by lines 3—3 and 4—4, respectively, on Fig. 2. Fig. 5 is an enlarged view of the clamping nut, with the outer part appearing in cross section. Fig. 6 is a reduced side elevation of another form and application of the invention. Fig. 7 is a fragmentary side elevation of another form of the invention. Fig. 8 is a fragmentary side elevation of still another form of the invention. Fig. 9 is an enlarged longitudinal detailed sectional view of the adjustable work engaging means illustrated in Figs. 7 and 8 and Fig. 10 is a view taken as indicated by line 10—10 on Fig. 9.

The invention may be embodied in forms for use in various classes of work and in a wide range of sizes. In Figs. 1 to 4, inclusive, of the drawings I have illustrated a typical embodiment of the invention useful in flanged pipes and adapted for use in conjunction with the fabricator disclosed in my copending application referred to above. It is to be understood that the invention is not limited or restricted to this particular illustrative form and application of the invention and is to be construed as embodying any features or modifications that may fall within the scope of the claims.

The templet of the present invention may be said to comprise, generally, an elongate extensible and contractible body 10, one or more branch parts 11 supported on the body 10 for axial, rotary and angular adjustment thereon, one or more branch parts 12 mounted on the body 10 for bodily lateral movement, pivotal adjustment and longitudinal movement on the body and pipe or object-engaging elements 13 on the body 10 and branch parts 11 and 12 supported for universal adjustment.

The body 10 is an elongate structure for carrying the branch parts 11 and 12 and adapted to be provided at one or both of its ends with the universally adjustable pipe engaging elements 13. In accordance with the invention the body 10 is capable of elongation and contraction so that its elements 13 may be correctly engaged or mated with pipe parts or pipe flanges spaced different distances apart. The templet body 10 comprises two or more telescopically related relatively shiftable sections. In the simple case illustrated, the body 10 includes two sections 14 and 15. The section 15 is engaged or telescoped within the section 14. The sections 14 and 15 may be such that the section 15 may be substantially entirely received within the section 14 or may be withdrawn from the section 14 at a distance almost equaling its length as the conditions of use may require.

The section 14 is an elongate tubular part having one end open to receive the section 15. The section 14 may be formed of polished or finished thin walled tubing to be light in weight and to accurately carry the other parts. As illustrated, the section 14 is uniform in external diameter and the section 15 is likewise uniform in external diameter and is proportioned to rather accurately fit within the section 14. The section 15 may be a solid rod-like part but it is usually preferred to construct it of tubing to reduce the weight and to conserve metal. The section 15 slidably or shiftably enters the section 14 and cooperates with the internal wall of the section 14 throughout the extent of its entry or penetration to be held in axial alignment with the section 14 and to remain steady.

The end of the section 14, which receives the section 15, carries means for releasably securing the two sections against relative shifting. The end portion of the section 14 has longitudinal slots 16 and carries a clamping sleeve 17. The sleeve 17 is longitudinally split from its upper or outer end and has an external thread. A nut 18 is threaded on the split clamping sleeve 17. When the nut 18 is threaded inwardly on the sleeve 17, the sleeve 17 is contracted to contract or clamp the section 14 onto the section 15 so that the two sections are held against relative shifting. The section 15 has calibrations of length 9 that may be read with the end of the section 14 to determine the length of the templet when the templet is adjusted against the work, as illustrated in Fig. 1, so that the templet may be easily released from the work and then restored to its adjusted length. It will be observed that the body 10 is a simple structure whose length may be adjusted or varied at will as the conditions of use may require.

The part 11 is in the nature of an arm or branch mounted on the body 10 for axial adjustment therealong, for turning adjustment thereabout, for angular adjustment about an axis transverse of the body 10 and for projection and retraction relative to the body. In practice the branch part 11 may be an elongate tubular element and, as illustrated, may be of the same stock or tubular material as the body section 14. The invention contemplates the employment of branch parts 11 of selected lengths and the templet may be supplied with branch parts 11 throughout a wide range of lengths to adapt the templet for extensive use. The adjustable flange or pipe engaging elements 13 may be provided on one or both ends of the branch part 11, as will be later described.

The invention includes novel and effective means for adjustably mounting the branch part 11 on the body 10. This adjustable mounting means includes two complementary collars 19 and 20, the collar 19 being on the body section 14 and the collar 20 being engaged about the branch part 11. The collars 19 and 20 may be substantially identical, the collar 19 having an opening 21 for receiving the body section 14 and the collar 20 having an opening 22 for receiving the branch part 11, see Fig. 4. The collar 19 is split and has a pair of spaced ears or lugs 23 and 24. The collar 20 is likewise split and has a similar pair of projecting lugs 25 and 26. The ears or lugs project radially along the split sides of the collars 19 and 20. The lugs 24 and 26 are preferably quite heavy and bear or engage one against the other, as best illustrated in Fig. 4 of the drawings. The engagement of these lugs 24 and 26 holds the pairs of lugs of the two collars in substantially parallel relation. Pairs of aligned transverse openings are provided in the pairs of lugs and a pivot bolt or clamp bolt 27 passes through these openings. The head of the bolt 27 engages one of the outer lugs, for example, the lug 23 and a nut 28 is threaded on the bolt to clamp against the other outer lug 25.

With the construction thus far described the bolt 27 connects the collar 20 of the branch part 11 with the collar 19 on the body 10 so that the branch part is supported by the body and the tightening of the nut 28 is adapted to simultaneously clamp the collars on the body section 14 and the branch part 11 to releasably secure the branch part 11 in the selected or required position. It will be seen that when the nut 28 is loosened that the collar 19 may be shifted and/or turned on the body section 14, that the branch part 11 may be shifted through its collar 20 and that the collar 20 may be pivoted or turned with respect to the collar 19 to change the angular position of the branch part 11 with respect to the body 10. The cooperating collars 19 and 20 are constructed to have extensive frictional engagement to effectively resist unintentional shifting or relative turning when the branch part 11 has been set or secured in the required position. The engaging or cooperating faces of the collar lugs 24 and 26 have meshing or mating annular teeth or ridges 29. The surfaces or sides of these ridges 29 have a slight pitch or inclination to increase their cooperating areas and to increase the frictional contact. The annular engaging ridges 29 are concentric with the axis of the bolt 27. When the nut 28 is tightened the ridges 29 are pressed one within the other and their cooperating pitched surfaces effectively prevent relative pivotal movement between the body 10 and the branch part 11. The body section 14 may have calibrations of length 8 to be read with an end of the collar 19 and the branch part 11 may have similar calibrations 7 to be read with the end of the collar 20 so that the position of the branch part may be accurately determined and so that the branch part may be readily reset in its adjusted position. Where two or more branch parts 11 are incorporated in the templet they each may be adjustably secured on the body 10 by a pair of the cooperating relatively adjustable collars 19 and 20, as just described.

The branch part 12 carries a universally adjustable element 13 and is adjustably supported on the body 10. The branch part 12 is in the form of an elongate clamp supported on the body 10 for bodily lateral adjustment and for rotary adjustment and longitudinal movement on the body. The branch part 12 is generally U-shaped in plan view having two side parts or sections 30 separated by an elongate notch 31 and a relatively narrow slot 32. The notch 31 is of substantial width to receive the body section 14 with substantial clearance and is of substantial length so that the branch part 12 may be shifted a considerable distance transversely relative to the body 10. The end parts of the sections 30 separated by the slot 32 are thickened but may be relatively short. A split sleeve is composed of a pair of opposing blocks 33 engaged about the body section 14. The blocks 33 have opposing seats or grooves 34 for receiving and conforming to the cylindrical body section 14. The external surfaces of the blocks 33 are flat and are slidably received within the notch 31, whose walls are of corresponding shape. Pins 35 project from the outer sides of the blocks 33 and are slidably and turnably received in elongate slots 36 in the arms or sections 30. The pins 35 are longitudinally aligned and their common axis preferably intersects the longitudinal axis of the body section 14. The pins 35 are engageable with the end walls of the slots 36 to limit the lateral adjustment of the branch part 12 relative to the body 10.

The thickened end portions of the sections 30 have aligned transverse openings 37 passing or receiving a clamp bolt 38. The head of the bolt 38 engages the outer side of one section 30 and a nut 39 is threaded on the other end of the bolt to clamp against the other section 30. A similar bolt 38ª is passed through the slots 36 and has a threaded nut 39ª. When nut 39 is tightened the sections 30 are clamped against the blocks 33 to prevent shifting and pivoting of the branch part 12 relative to the body 10 and the blocks 33 are tightly clamped onto the body section 14 so that the branch part 12 cannot turn or shift longitudinally along the body. The bolt 38 also serves to clamp the adjustable element 13 of the branch part 12 in the selected position, as will be subsequently described. The nut 39ª may be tightened on bolt 38ª supplementing the clamping action of nut and bolt 38 and 39, respectively.

The universally adjustable elements 13 are adapted to conform to and to be fitted against spaced pipe parts, or the like, at the job or installation, taking the place of or simulating the parts of the pipe unit or assembly that is to be fabricated and installed. In the form of the invention illustrated, the elements 13 are designed to fit against or mate with pipe flanges F of the type employed to secure together welded up piping assemblies, it being understood that this is merely illustrative of the invention. The elements 13 on the body 10 and the branch part 11 may be identical and corresponding reference numerals are applied to their corresponding parts. Each of these elements 13 includes a split sleeve 40 engaged on an end of the body 10 or the branch part 11, as the case may be. The sleeves 40 may be split into two sections. In accordance with the invention the split sleeves 40 are connected with the body 10 and branch part 11 for free relative rotation when loosened for adjustment but are held against displacement from the body and branch part. Annular corrugations 41 are provided on the end portions of the body 10 and branch part 11 and complementary corrugations 42 are provided on the interiors of the sleeves to cooperate with the corrugations 41. The corrugations 41 and 42 have curved surfaces and allow turning of the sleeves 40 but effectively prevent unintentional detachment of the sleeves.

Each sleeve 40 has a transverse opening 44 passing through its split portion. Clamp bolts 45 are passed through these transverse openings and have nuts 46 threaded on their ends. By tightening the bolts the sleeves 40 may be clamped onto the body 10 and the branch part 11. The outer ends of the sleeves 40 have sockets 47. The sockets 47 have spherically curved concave walls and receive balls 48. Stems 49 extend outwardly from the balls 48 to project from the outer ends of the sleeves 40. The stems 49 carry the work engaging parts. In the construction illustrated, the stems 49 carry disc-like parts, which I will term flanges 50, which correspond generally to the flanges of the piping assembly which is to be fabricated. In the preferred construction the flanges 50 are detachably secured to the stems 49 so that they may be replaced by flanges or other parts for cooperating with pipe flanges, etc. of different sizes, types, etc. The flanges 50 have threaded openings 43 receiving threaded end parts of the stems 49. The flanges 50 have circumferentially spaced openings 51 which may correspond in spacing and size to the openings of the flanges to be provided on the piping assembly. Each sleeve 40 has a slot or notch 52 extending inwardly from its outer end. The slots 52 are adapted to receive the stems 49 to allow rocking or pivoting of the balls 48 in the sockets 47. This allows the flanges 50 to be swung to any required angular relation with respect to the body 10 and branch part 11. As above described, the sleeves 40 are turnable on the body 10 and branch part 11 which allows the flanges 50 to be turned so that their openings 51 are brought into register with the openings of the pipe parts. It is believed that it will be apparent how the flanges 50 provided with the ball and socket mountings and carried by the turnable sleeves 40 may be universally adjusted.

The element 13ª of the branch part 12 includes a socket 47ª formed in the thickened parts of the sections 30. The socket 47ª has spherically concaved walls and receives a ball 48ª. A stem 49ª projects from the ball 48ª and extends from the outer end of the part 12. The outer end of the stem 49ª is provided with a removable flange 50ª which may be the same as the flanges 50. The side wall of the socket 47ª is notched to receive the stem 49ª so that the flange 50ª may be brought to any angular position.

In the use of the templet the templet is brought to the location where the piping is to be installed. In Fig. 1 of the drawings I have illustrated a typical manner in which the templet may be used at the work. In this figure there are three pipe parts A, B and C projecting from or exposed at different adjacent walls of a structure, apparatus or assembly. The pipe parts A and B are longitudinally aligned, while the pipe part C projects from a side wall and is angularly disposed relative to the pipe parts A and B. Each pipe part A, B and C is provided at its exposed end with a connecting or coupling part. In the case illustrated, flanges F are provided on the pipe parts A, B and C. It will be assumed that a pipe unit or assembly is to be fabricated and connected up between the pipe parts A, B and C and that the templet is to be employed to facilitate the accurate fabrication of the pipe unit or assembly.

The templet is brought to position at the projecting pipe parts and if the nut 18 has not been previously loosened it is backed off to permit adjustment in the length of the body 10. The flange 50 on the element 13 at one end of the body 10 may be engaged against the flange F of a pipe part A or B. For example, in the case illustrated, the flange 50 of the element 13 on the lower end of the body 10 may be engaged with the flange F on the pipe part B. It is usually preferred to line up the openings 51 of the flange 50 with the openings in the flange F and, if desired, the flange 50 may be temporarily bolted to the flange F by two or more bolts to bring the openings into correct registration and to maintain this registration until the templet is finally adjusted or set. It will be observed that the sleeve 40 on the lower end of the body 10 may be turned to permit the ready registration of the flange openings and then secured in the selected rotative position by tightening the nut 46. Tightening of the nut 46 clamps the sleeve 40 on the body section 14 and clamps the ball 48 in the socket 47 so that the flange 50 cannot thereafter turn.

The body section 15 is then adjusted or shifted to bring its element 13 to the correct position at the pipe part A. The flange 50 of the element 13 on the upper end of the section 15 may be brought against the face of the flange F on the pipe part A and turned to bring its openings 51 into registration with the openings in the flange F, the turnable sleeve 40 permitting this rotation of the flange 50. Two or more bolts may be passed through the registering openings of the flange F and the flange 50 to temporarily secure the flange 50 to the flange of the pipe part A. This positively positions the flange 50 in the correct position. The nut 18 is tightened to hold the body section 15 against movement with respect to the section 14 and the nut 46 on the upper element 13 is tightened down to clamp the sleeve 40 against turning and to clamp the ball 48 in the socket 47 to secure the flange in the correct position. It is to be observed that the universally mounted flanges 50 may be rocked or tilted to flatly bear against the flanges F of the pipe parts A and B and where the flanges of the pipe parts A and B are not in the parallel relation as illustrated the elements 13 may be readily adjusted and set so that their flanges 50 occupy positions against the flanges F that are to be later occupied by the flanges of the piping assembly or unit to be fabricated.

The branch part 11 may be easily adjusted or moved to position its element 13 for connection with the pipe part C. Assuming that the nut 28 is loose the collar 19 may be readily slid along the body section 14 and may be turned on the body section to bring the part 11 to the desired rotative position and elevation. The collar 20 may be pivoted on the bolt 17 to swing the branch part 11 to the required angle and the part 11 may be adjusted longitudinally through the collar 20 to bring the flange 50 of its element 13 into engagement with the flange F of the pipe part C. The nut 28 may be tightened down when the adjustments have been made. The flange 50 supported by the ball and socket connection and carried by the rotatable sleeve 40 may be easily brought to the position where its face flatly bears on the face of the flange F on the pipe part C and where its openings 51 register with the openings in the flange F. When these adjustments have been made the nut 46 is tightened down. Prior to this the flange 50 may be temporarily bolted to the flange F on the pipe part C to assure the correct setting of the flange 50.

Where the piping assembly or unit to be fabricated requires a lateral for connecting with a previously installed pipe part the branch part 12 comes into use. With the nuts 39 and 39a loose the branch part 12 may be pivoted and shifted transversely with respect to the body section 14 and may be bodily rotated or turned on the body section 14. Furthermore, the branch part 12 mounted on the body section 14 through the medium of the blocks 33 may be adjusted or shifted along the body section 14. These several adjustments bring the branch part 12 to the position where its element 13a may be made to correctly mate with the stationary pipe part. The flange 50a mounted on the branch part 12 through the ball and socket connection may be rocked or tilted to any required position and may be rotated to line up its openings with the openings of the previously installed pipe flange. When the several adjustments have been made the nuts 39 and 39a are tightened to secure the branch part 12 in the adjusted position and to secure the element 13a against movement. It is to be observed that the bolts 38 and 38a operate to secure the branch part 12 in the adjusted position on the body 10 and also serve to secure its element 13a in the adjusted position.

When the several parts of the templet have been adjusted and set the templet is disengaged from the pipe parts A, B and C and may be used as a templet in assembling or fabricating the pipe unit that is to be installed or it may be employed in connection with the fabricator disclosed in my co-pending application referred to above. It is to be observed that the templet, when properly employed, has its pipe engaging parts or flanges 50 and 50a in the exact positions or relations that are to be later occupied by the parts or flanges of the pipe unit to be fabricated. This materially facilitates the assembly or fabrication of the piping unit.

It is to be understood that the templet of the invention may be adjusted and set by performing the several operations in a sequence other than that described in detail above and that the description of operation set forth herein is merely typical. Furthermore, it is to be understood that the templet may embody two or more branch parts 11 and two or more branch parts 12 as the conditions of use may require and that such parts are readily assembled on and removed from the body 10.

Fig. 6 illustrates one manner in which the templet of the invention may be employed in connection with very large pipe flanges. In this application there are two large flanges 60 and 61 and a slightly smaller lateral flange 62 for mating with the flanges of the work or pipes. The flanges 60 and 61 are generally parallel and, as illustrated, are substantially horizontal but the flange 60 is pitched at a slight angle. The flanges 60 and 61 are connected by two or more templet body assemblies each comprising the telescopically related sections 14 and 15 adapted to be connected or locked in the selected positions by the sleeve and nut connections 17 and 18, as above described. The sleeves 40 on the ends of the sections 14 and 15 carry the balls 48 which in turn are provided with the stems 49, all as above described. The stems 49 are suitably connected with their respective flanges 60 and 61, for example, they may be threaded into openings in the flanges. One or more brace templet assemblies may be connected between the flanges 60 and 61. Thus, as illustrated, there is a diagonal templet assembly 14 and 15 connected between the flanges 60 and 61 and its stems 49 are suitably secured to the flanges. It will be seen how the telescopically related templet assemblies may be adjusted and locked to secure the flanges 60 and 61 in their required positions where they mate with the work.

The lateral flange 62 is supported by two or more templet body assemblies 14—15 whose outer stems 49 are suitably connected with the flange. The inner ends of these supporting assemblies may be mounted on one or more of the assemblies 14—15 connected between the flanges 60 and 61 by the adjustable collar connections 19—20 described in detail above. In some cases the supports for the lateral flange 62 may be branch parts 11 or 12 of the templets which connect the flanges 60 and 61. A two-way brace assembly 63 assists in supporting the lateral flange 62. This two-way brace assembly may be made up of a templet body combination 14—15 whose ball and socket stems 49 are secured to the flange 60 and flange 62. It will be seen that this two-way brace structure ties together and braces the parts of the templet structure. Fig. 6 merely illustrates one manner in which a plurality of the templet means of the invention may be employed and is not to be construed as limiting the application of a plural use of the templets.

Figs. 7 to 10, inclusive, illustrate forms of the invention useful where the work to be engaged has large or relatively large pipe flanges. Furthermore, the templet structures illustrated in Figs. 7 and 8 have a wider range of use and adjustment.

Fig. 7 illustrates a portion of a templet embodying a body assembly comprising body sections 14ᵇ and 15ᵇ. The section 14ᵇ may be a straight tubular member, while the section 15ᵇ is angular having a 90° bend between its ends. The body sections 14ᵇ and 15ᵇ are preferably of larger or heavier tubular stock than the sections 14 and 15 described above. The sections 14ᵇ and 15ᵇ are connected by a split clamp 70 on the outer end of the section 14ᵇ. The clamp 70 is provided at its opposite sides with clamp bolts 71 whereby the section 14ᵇ may be clamped onto the section 15ᵇ to prevent relative movement between the sections. Fig. 8 of the drawings illustrates a body section 15ᶜ which has a 45° bend or angle at a point between its ends. In other respects, the section 15ᶜ may be the same as the section 15ᵇ. It is to be understood that the body sections of the templet may have curves or bends different in character and degree from those illustrated and at either one or both of the telescopic body sections of the templet may be angular. It will be seen that the work engaging means 13ᵇ carried by the angular sections 15ᵇ and 15ᶜ may be brought to the required positions by shifting the sections in their respective sections 14ᵇ or by turning the sections 15ᵇ and 15ᶜ, or both. The outer ends of the body sections 14ᵇ and 14ᶜ described above are provided with work engaging means 13ᵇ designed for engaging large or relatively large flanges of the work.

Each work engaging means 13ᵇ comprises a base member 72 rigidly secured to the end of a section 15ᵇ or 15ᶜ as the case may be. The base member 72 may have a stem 73 centering in the body section 15ᵇ or 15ᶜ and the base member may be welded to the body section as at 74. The base member 72 is a plate or flange-like part projecting radially from the end of the body section. A ball member 75 is centrally arranged on the outer side of the base member 72 and may be secured to the base member by bolts or screws 76. The outer end of the ball member 75 is dome shaped having a spherically curved convex outer surface 77. The ball member 75 is tubular or hollow and its outer end has a spherically curved concave internal surface 78 whose axis is coincident with the axis of the surface 77. Two diametrically opposite windows or openings 79 are provided in the inner portion of the ball member 75. The outer end of the ball member 75 is open for the purpose to be later described.

A socket element 80 is arranged on the outer end of the ball member 75. The socket member 80 has a concave spherically curved seat or socket 81 receiving or cooperating with the external surface 77 of the ball member 75. A central stud or stem 82 is provided on the socket member 80 and a work engaging flange 83 is removably threaded on the stem. The flange 83 has circumferentially spaced openings 84 adapted to register with the openings or some of the openings in the work flanges or pipe flanges. The flange 83 may be removed from the stem 82 and replaced by flanges of different sizes.

Each work engaging means 13ᵇ further includes means associated with the socket member 80 for cooperating with the internal spherical surface 78 of the ball member 75. This means includes a yoke or transverse bar 85 which passes through the openings 79 with clearance. The bar 85 is received in the openings 79 with suitable clearance to have extensive movement therein. The outer ends of the bar 85 are connected with the socket member 80 by studs or bolts 86. A central spherical boss 87 is provided on the upper side of the bar 85 and carries a block 88 which is shaped to conform to the boss. The block 88 carries an inner ball element 89 for cooperating with the internal spherical surfaces 79 of the ball member 75. A rod or stud 90 passes through aligned central openings in the boss 87, block 88 and ball element 89 and is secured in a central opening in the stem 82. In practice the stud 90 may be fixed in the stem 82 by welding. It will be seen that with the nuts 86ᵃ of the bolts 86 properly set or adjusted the ball element 89 is in effective bearing cooperation with the internal spherical surface 78 of the member 75 and the surface 81 of the socket member 80 is in effective cooperation with the external spherical surface 77 of the ball member 75. It is to be observed that the socket member 80 which carries the work engaging flange 83 is provided with or carries parts which cooperate with both the external and internal surfaces 77 and 78 of the ball member 75, there being ample surface engagement to maintain the flange carrying member 80 stable and firm. A spring 91 surrounds the stud 90 and is under compression between the ball element 89 and the seat or wall of the socket element 80 to assist in freeing the surfaces for ready adjustment of the work engaging means when the flange 83 is to be tilted or adjusted.

Means is provided for setting or releasably securing the work engaging means 13b in the condition where the flange 83 is in the desired position. In practice this means may constitute studs engageable between the base member 72 and the flange-like lower portion of the socket member 80, which studs may be adjusted to positively prevent unintentional movement of the socket member. In the case illustrated the releasable holding means comprises an annular series of bolts or studs 92 arranged through openings 93 in the lower flange 94 of the socket member 80 and passing through openings 95 in the base member 72. The openings 93 and 95 are arcuate and receive the studs 92 with substantial clearance and the walls of the openings 93 and 95 flare toward their opposite ends so that the studs 92 may tip or rock when the socket member 80 is adjusted with respect to the ball member 75. Nuts 96 are threaded on the studs 92 and have rounded or partially spherical parts 97 for engaging in the openings 93 and 95. The nuts 96 are threaded on the opposite ends of the studs 92 and have extensive threaded engagement with the studs so that they may be threaded along the studs to effect any required adjustment of the flange 83 or to permit any required adjustment. It will be seen that when the nuts 96 are brought against the base member 72 and the flange 94 they serve to positively hold the socket member 80 in place.

It is to be understood that the work engaging means 13b illustrated in Figs. 7 to 10, inclusive, of the drawings, may be employed in any of the forms of the invention. The flanges 83 are supported for limited universal movement and may be set in the required position to cooperate with the work.

Having described typical preferred forms and applications of my invention, I do not wish to be restricted to the specific details herein set forth, but wish to reserve to myself any variations or modifications that may appear to those skilled in the art and fall within the scope of the following claims.

Having described my invention, I claim:

1. A templet comprising an extensible and contractible body, releasable means for holding the body against extension or contraction when adjusted to the desired length, a first branch part, means for mounting the first branch part on the body with its longitudinal axis offset from that of the body and for movement therealong, for pivotal movement with respect thereto on an axis transverse of the body and for bodily movement along its own longitudinal axis and operable to releasably secure the first branch part against movement, a second branch part, means for mounting the second branch part on the body so its longitudinal axis intersects that of the body and for movement therealong and for movement laterally thereof and operable to releasably secure the second branch part against movement, and work engaging elements on the body and the branch parts.

2. In combination, an elongate body, a work engaging element, and means for mounting the element on the body comprising a part slidable along and turnable on the body, a part on the element, one part having a socket, a ball on the other part movably engaged in the socket, and a single bolt means for releasably holding the first named part against turning and sliding along the body on the body and releasably holding the ball against movement in the socket.

3. In combination, an elongate body, a work engaging element and means for mounting the element on the body comprising a split sleeve slidable along and turnable on the body and having a socket, a ball on the element movably engaged in the socket, and a single screw for compressing the split sleeve to prevent turning and sliding of the sleeve on the body and to prevent movement of the ball in the socket.

4. In a templet of the class described, a body, a branch part comprising sections passing at opposite sides of the body, blocks engaged on the body and carrying the branch part for bodily shifting, and bolt means for urging the sections toward one another to clamp the blocks onto the body and to clamp the sections onto the blocks so that the branch part is held against movement.

5. In a templet of the class described, a body, a branch part comprising sections passing at opposite sides of the body, blocks engaged on the body and carrying the branch part for bodily shifting, the sections having a socket between them at one end of the branch part, a work engaging element, a ball on the element tiltably engaged in the socket, and a single bolt passing through openings in the sections for clamping the sections onto the blocks, for clamping the blocks onto the body and for clamping the ball against movement in the socket.

JOHN A. WOODS.

REFERENCES CITED

The following references are of record in the file of this patent:

UNITED STATES PATENTS

| Number | Name | Date |
| --- | --- | --- |
| 180,881 | Hawson | Aug. 8, 1876 |
| 281,311 | Snell | Aug. 17, 1883 |
| 471,156 | Tinsley | Mar. 22, 1892 |
| 1,455,441 | Hodney | May 15, 1923 |
| 1,631,831 | Palmer-Jones | June 7, 1927 |
| 1,882,483 | Cannon | Oct. 11, 1932 |
| 2,095,059 | Donnelly | Oct. 5, 1937 |
| 2,205,311 | Sabatello | June 18, 1940 |

FOREIGN PATENTS

| Number | Country | Date |
| --- | --- | --- |
| 9,137 | Great Britain | Apr. 22, 1903 |
| 128,677 | Germany | Mar. 3, 1902 |
| 347,410 | Germany | Jan. 18, 1922 |
| 523,658 | France | Aug. 22, 1921 |
| 826,525 | France | Apr. 1, 1938 |